US012741301B2

(12) United States Patent
Yang et al.

(10) Patent No.: US 12,741,301 B2
(45) Date of Patent: Sep. 22, 2026

(54) CLEANING SYSTEM AND METHOD FOR A CURVED SUBSTRATE

(71) Applicant: Samsung Display Co., Ltd., Yongin-Si (KR)

(72) Inventors: Jinwook Yang, Yongin-si (KR); Se Hun Park, Yongin-si (KR); Jongwon Park, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/882,746

(22) Filed: Sep. 12, 2024

(65) Prior Publication Data

US 2025/0196205 A1 Jun. 19, 2025

(30) Foreign Application Priority Data

Dec. 13, 2023 (KR) ........................ 10-2023-0180844

(51) Int. Cl.

| | |
|---|---|
| ***B08B 11/04*** | (2006.01) |
| ***B08B 1/12*** | (2024.01) |
| ***B08B 1/16*** | (2024.01) |
| ***B08B 1/20*** | (2024.01) |
| ***B08B 1/34*** | (2024.01) |
| ***B08B 3/02*** | (2006.01) |
| ***B08B 7/00*** | (2006.01) |
| ***B08B 13/00*** | (2006.01) |

(52) U.S. Cl.

CPC ................ *B08B 11/04* (2013.01); *B08B 1/12* (2024.01); *B08B 1/165* (2024.01); *B08B 1/20* (2024.01); *B08B 1/34* (2024.01); *B08B 3/022* (2013.01); *B08B 7/0071* (2013.01); *B08B 13/00* (2013.01); *B08B 2220/01* (2013.01)

(58) Field of Classification Search

CPC B08B 11/04; B08B 1/12; B08B 1/165; B08B 1/20; B08B 1/34; B08B 3/022; B08B 7/0071; B08B 13/00; B08B 2220/01

See application file for complete search history.

(56) References Cited

U.S. PATENT DOCUMENTS 12,583,021 B1 * 3/2026 Winter .................... B08B 11/00
2019/0255581 A1 * 8/2019 Yang ......................... B08B 3/04

FOREIGN PATENT DOCUMENTS

CN 103418558 A * 12/2013 ............ H10P 70/277
CN 118744124 A * 10/2024 ............. B08B 13/00
JP 2021126505 A * 9/2021

(Continued)

*Primary Examiner* — Marc Carlson

(74) *Attorney, Agent, or Firm* — Innovation Counsel LLP

(57) ABSTRACT

A curved target substrate cleaning system includes a pressure-type cleaning unit for cleaning a cleaning area of a target substrate having a curved surface by applying pressure to the cleaning area, a support body detachably supporting the pressure cleaning unit at a predetermined height with respect to a cleaning area of the target substrate having the curved portion, a cleaning area flat maintaining unit that clamps one end of a target substrate having a curved portion and adjusts a height of the curved portion to maintain the cleaning area of the target substrate in a predetermined orientation with respect to the pressure-type cleaning unit, and a moving unit that moves the cleaning area flat maintenance unit back and forth in one direction with respect to the pressure-type cleaning unit.

11 Claims, 12 Drawing Sheets

(56) References Cited

FOREIGN PATENT DOCUMENTS

| | | | | | |
|---|---|---|---|---|---|
| KR | 10-2012-0009629 A | | 2/2012 | | |
| KR | 20120009629 A | * | 2/2012 | ........... | G02F 1/1303 |
| KR | 20130131232 A | * | 12/2013 | ............ | H10P 70/277 |
| KR | 10-2016-0011201 A | | 1/2016 | | |
| KR | 20160011201 A | * | 1/2016 | ............... | B08B 1/50 |
| KR | 20210012934 A | * | 2/2021 | .......... | H10P 72/3302 |
| KR | 10-2022-0065918 A | | 5/2022 | | |
| KR | 20220065918 A | * | 5/2022 | ............... | B08B 1/40 |
| KR | 20260040799 A | * | 3/2026 | ............. | E01C 23/14 |
| WO | WO-2016067562 A1 | * | 5/2016 | .......... | H10P 72/7608 |

* cited by examiner

CLEANING SYSTEM AND METHOD FOR A CURVED SUBSTRATE

CROSS-REFERENCE TO RELATED APPLICATION

This application claims priority to and the benefit of Korean Patent Application No. 10-2023-0180844 filed at the Korean Intellectual Property Office on Dec. 13, 2023, the entire contents of which are incorporated herein by reference.

BACKGROUND

(a) Field of Disclosure

This inventive concept relates to a curved target substrate cleaning system and method, and more specifically, to a multi-curvature target substrate cleaning system and method that can accommodate various curvatures by applying a height-adjustable clamp means to maintain the cleaning area at an optimal orientation for cleaning regardless of change in curvature.

(b) Description of the Related Art

Today, the display field is developing rapidly to keep pace with the information age. As part of this development, flat panel displays FPD, which have the advantages of being thinner, lighter, and having lower power consumption, have become widely-used.

As a flat panel display device, a liquid crystal display (LCD), a plasma display panel (PDP), an electroluminescent display (ELD), a field emission display (FED), and an organic light emitting diode (OLED) display, and these flat display devices are rapidly replacing existing cathode ray tube (CRT) displays.

Flat display devices are being applied to a variety of devices such as mobile communication terminals, laptops, monitors, and TVs. In particular, a variety of touch screen devices with large screens without buttons are being widely used recently.

These various touch screen devices are covered with glass (cover glass).

The cover glass protects the underlying display panel from damage by the user's touch. and the cover glass is typically made of a glass material. During the manufacturing process of the cover glass, a large piece of glass is cut into a predetermined cover glass size, and a connector for connecting with internal components such as the display panel of the flat panel display device, speaker, microphone, and camera is formed along at least one edge of the cover glass.

The cover glass undergoes a cleaning process to remove foreign substances during the cover glass manufacturing process in order to be bonded to the internal components.

The conventional cover glass cleaning process is performed by transporting the cover glass to be cleaned using a conveying means such as a roller or belt. However, the traditional flat pressure cleaning became difficult, maybe even impossible, as the curvature and size of the cover glass increased in variety.

SUMMARY

The disclosure provides a multi-curvature target substrate cleaning system and cleaning method that can respond to various curvatures by maintaining the cleaning area at a predetermined optimal cleaning angle by using a height-variable clamp.

Additionally, the present disclosure provides a cleaning system and cleaning method for a curved target substrate that can perform pressure cleaning without damaging the cover glass.

A cleaning system for a curved target substrate according to an embodiment includes a pressure-type cleaning means for cleaning a target substrate having a curved portion by applying pressure to the cleaning area, a support body detachably supporting the pressure-type cleaning unit at a predetermined height with respect to a cleaning area of the target substrate having the curved portion; a cleaning area horizontal maintaining unit that clamps one end of a target substrate having the curved portion and adjusts a height of the curved portion to maintain the cleaning area of the target substrate in a predetermined orientation with respect to the pressure-type cleaning unit, and a moving unit that moves the cleaning area horizontal maintenance unit back and forth in one direction with respect to the pressure-type cleaning unit.

In the method of cleaning a curved target substrate according to an embodiment of the disclosure, a cleaning area horizontal maintenance unit clamps the tip of the curved target substrate, adjusts the height of a cleaning area of the curved target substrate, wherein the cleaning area of the curved target substrate is disposed in a predetermined orientation with respect to the pressure-type cleaning unit regardless of change in curvature.

A method of cleaning a curved target substrate according to an embodiment of the disclosure includes acquiring curvature information that changes along the surface of the target substrate, and attaching the tip of the curved target substrate, clamping a tip of the curved target substrate with a clamping part based on the curvature information of the target substrate so that the cleaning area of the target substrate is maintained at a predetermined orientation with respect to the pressure-type cleaning unit regardless of change in curvature, and operating the pressure-type cleaning unit to perform pressure-type cleaning of the cleaning area of the target substrate, The arranging and maintaining of the cleaning area of the target substrate at a predetermined orientation (e.g., a horizontal orientation) with respect to the pressure-type cleaning unit includes adjusting the height of the clamping part using a height adjustment unit, and moving the clamping part horizontally with respect to the planer pressure-type cleaning unit by using a transfer unit.

The maintaining the cleaning area of the target substrate at a predetermined orientation with respect to the pressure-type cleaning unit includes adjusting the angle of the clamping part using a turn drive part.

The pressure cleaning of the cleaning area of the target substrate includes determining whether a working speed of the pressure-type cleaning unit is greater than a moving speed of the target substrate, determining the amount of pressure on the cleaning area.

Maintaining the cleaning area of the target substrate at a predetermined orientation with respect to the pressure-type cleaning unit is linked to acquiring curvature information that changes along the surface of the target substrate, so that the target substrate is positioned at the predetermined orientation with respect to the pressure-type cleaning unit regardless of change in curvature, and it may include causing the cleaning area horizontal maintenance unit to perform feedback control.

The pressure-type cleaning unit includes at least one of a cleaning roller, a knife, a blade, and a chemical cleaning means, and the cleaning roller, the knife, and the blade may be made of a silicone material.

According to the cleaning system and method according to an embodiment of the disclosure, the cleaning area of the target substrate is maintained horizontal by applying a height-variable clamping part, so that it can respond to various curvature shapes and can be used universally.

According to the cleaning system and method according to an embodiment of the disclosure, the stress applied to the target substrate can be minimized because the cleaning area can be maintained at an optimal orientation (e.g., horizontal) during cleaning so cleansing power can be maximized.

According to the cleaning system and cleaning method according to an embodiment of the disclosure, the material of the planer pressure-type cleaning means is a material such as silicon which is non-adhesive to contaminants, and the target substrate is applied to the pressure-type cleaning unit. For the lower support part, a material with greater durability than silicon may be used.

According to the cleaning system and method according to an embodiment of the disclosure, the probability of the cleaning area of the target substrate being cleaned can be increased by increasing the working speed or rotation speed of the pressure-type cleaning unit compared to the moving speed of the target substrate.

According to the cleaning system and cleaning method according to an embodiment of the disclosure, it is possible to prevent damage such as scratches from occurring in the cleaning area of the target substrate by controlling the amount of pressure of the pressure-type cleaning unit on the cleaning area of the target substrate.

According to the cleaning system and method according to an embodiment of the disclosure, before cleaning the cleaning area of the target substrate with a pressure-type cleaning unit, the target substrate is heated to 60 degrees or more, where adhesive contaminants can be effectively removed, and the adhesive is removed, so it can facilitate the removal of contaminants.

DETAILED DESCRIPTION OF THE EMBODIMENTS

Figure 1:
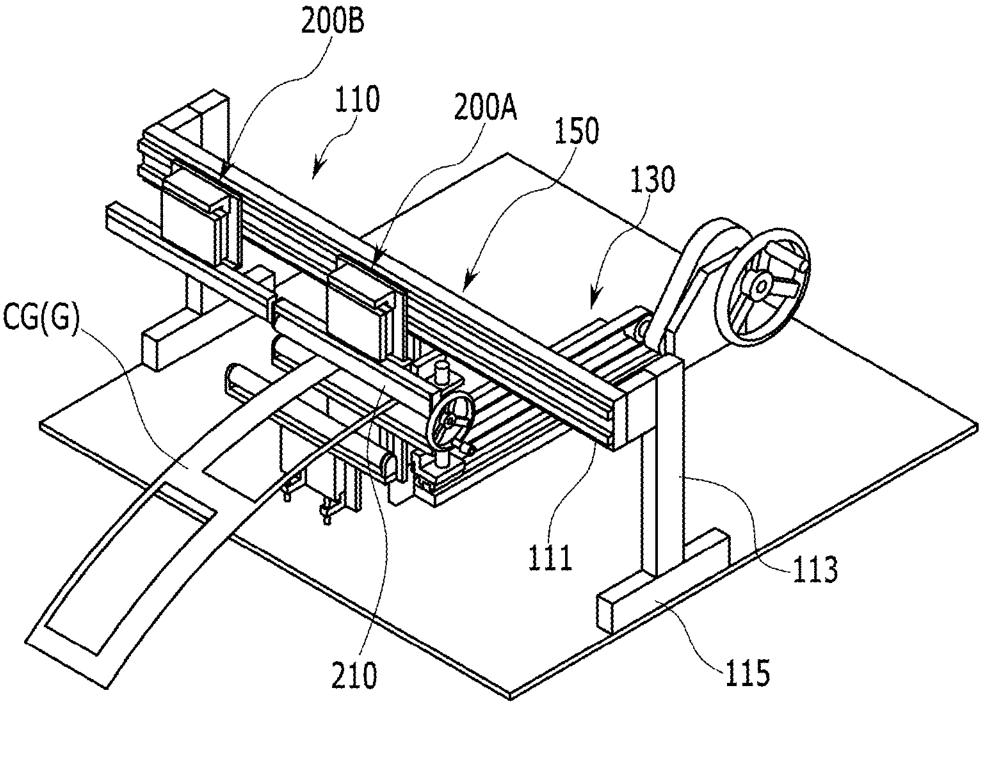
FIG. 1 is a configuration diagram of a curved target substrate cleaning device according to an embodiment of the disclosure.

The advantages and features of the present disclosure and methods for achieving them will become clear by referring to the embodiments described in detail below along with the accompanying drawings.

The present disclosure is not limited to the embodiments explicitly described below and may be implemented in various different forms. The embodiments are presented to ensure that the disclosure is complete and that common knowledge in the technical field to which the present disclosure pertains is not limited. The present invention is only defined by the scope of the claims.

When an element or layer is referred to as "on" another element or layer, it includes instances where the element or layer is directly on top of or intervening with the other element.

Like reference numerals refer to like elements throughout the specification.

Although ordinal terms such as "first," "second," etc. are used to describe various components, these components are not limited to any specific order by these terms.

These ordinal terms are used to distinguish one component from another.

Therefore, the "first" component mentioned below may also be a "second" component without departing from the technical spirit of the present invention.

As used herein, "horizontal" means substantially parallel to the ground.

As used herein, a "multi-curvature" substrate either has more than one curvatures along its surface, or has one curvature but the curvature varies from substrate to substrate. A "curved substrate," as used herein, is intended to refer to a substrate having one curvature or a multi-curvature substrate.

Hereinafter, embodiments of the present invention will be described with reference to the attached drawings.

Figure 2:
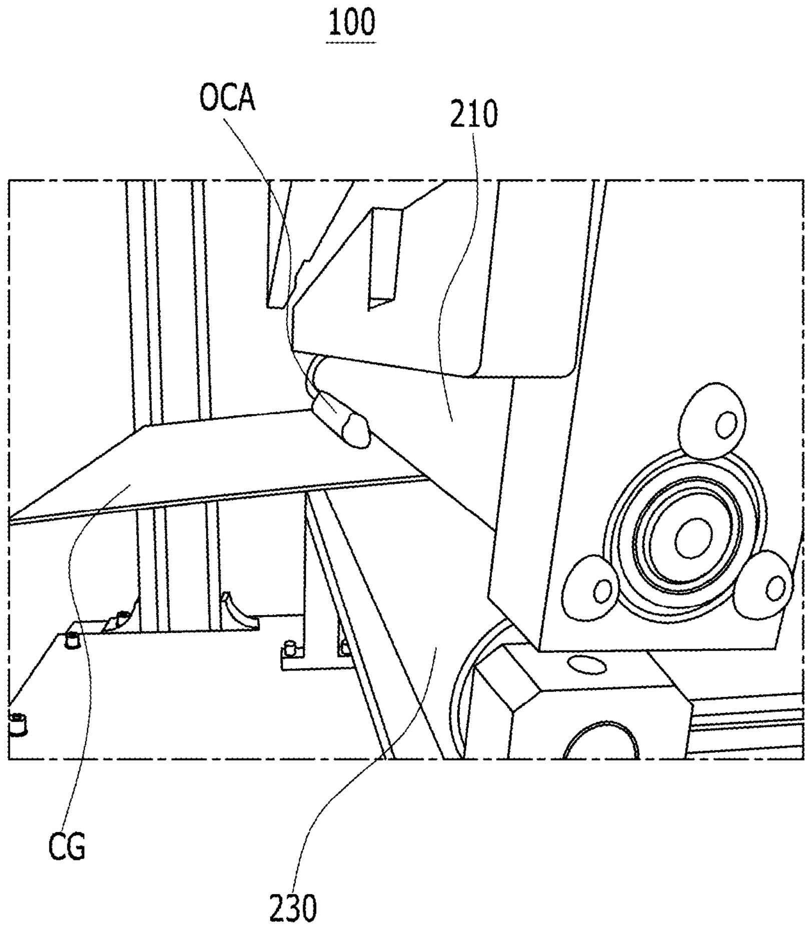
FIG. 2 is a diagram showing the cleaning process of the cover glass of FIG. 1.

FIG. 1 is a configuration diagram of a curved target substrate cleaning system according to an embodiment of the disclosure, and FIG. 2 is a photograph showing the cleaning process of the cover glass using FIG. 1.

As shown in FIG. 1 and FIG. 2, the curved target substrate cleaning system 100 includes a support body 110, a transfer unit 130, a cleaning area horizontal maintenance unit 150, and cleaning units (200A, 200B).

The cleaning units (200A, 200B) clean glass panels G or cover glasses CG of various curvature shapes one by one. The cleaning units (200A, 200B) are designed to implement step-by-step cleaning to increase cleaning accuracy, a first cleaning unit 200A and a second cleaning unit 200B may be provided.

Accordingly, the glass panel G, which is cleaned while passing through the first cleaning unit 200A in the first position, is cleaned again while passing through the second cleaning unit 200B in the second position.

The first cleaning unit 200A primarily performs flat pressure cleaning of adhesive contaminants OCA scattered on the glass panel G or cover glass CG (hereinafter referred to as target substrate) of various curvature shapes, and it functions to remove by a pressure-type cleaning means 210.

The second cleaning unit 200B performs an extra cleaning process by placing ethanol on the cleaning pad and rubbing it in a wiper style.

The first cleaning unit 200A and the second cleaning unit 200B can be combined with the replacement rail means 111 of the support body 110, and the replacement rail means 111 can be arranged at a certain height by the vertical support part 113 at both ends, providing a vertical space where the first cleaning unit 200A and the second cleaning unit 200B can perform cleaning operations on glass panels G or cover glass CG of various curvature shapes.

The vertical support part 113 can be firmly fixed and supported by the horizontal support part 115 with respect to the horizontal bed.

The transfer means 130 includes a conveyor belt for supplying a glass panel (G) or cover glass CG to the cleaning unit (200A, 200B) and multiple rolls supporting the conveyor belt, and it may include a suitable horizontal surface to stably support the glass panel (G) or cover glass CG during cleaning.

The transfer means 130 is a pressure-type cleaning means of the glass panel G or cover glass CG, that is, the cleaning area of the curved target substrate of the first cleaning unit 200A and the second cleaning unit 200B, it may include a transfer rail 131 on which the cleaning area horizontal maintenance unit 150 rests, which clamps one end of the curved target substrate so as to keep it at a predetermined orientation with respect to the pressure-type cleaning unit 210. In this disclosure, for simplicity, the predetermined orientation will be described as being horizontal, and vertical with respect to the support body 110. However, this is not a limitation of the disclosure and the inventive concept may be applied to any orientation that is optimal for cleaning.

Figure 3:
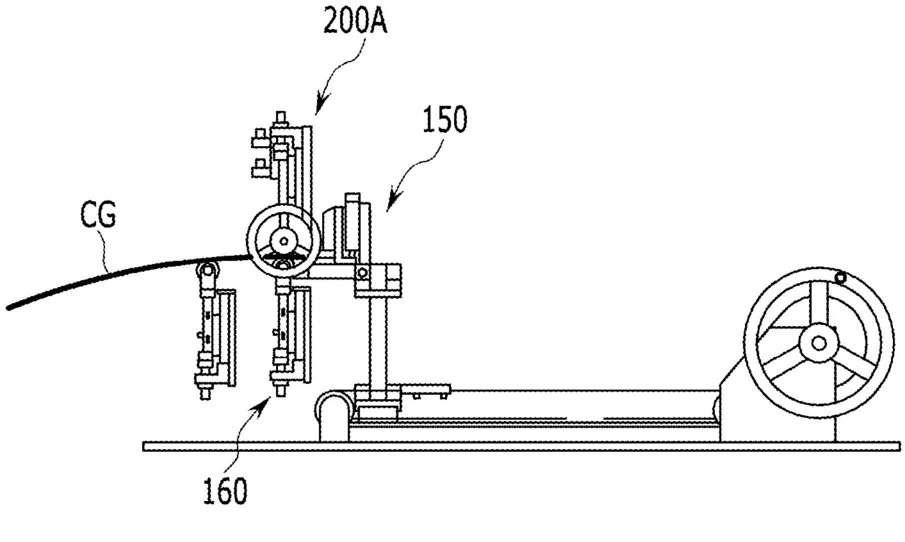
FIG. 3 is a first curvature cleaning state diagram of the curved target substrate cleaning system according to an embodiment of the disclosure.
Figure 4:
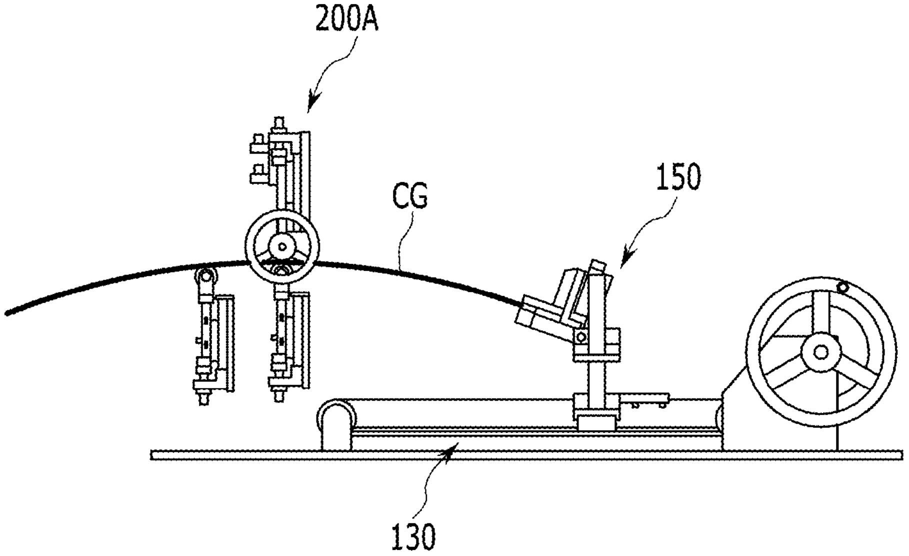
FIG. 4 is a second curvature cleaning state diagram of the curved target substrate cleaning system according to an embodiment of the disclosure.

FIG. 3 is a first curvature cleaning state diagram of the curved target substrate cleaning system according to an embodiment of the disclosure, and FIG. 4 is a second curvature cleaning state diagram of the curved target substrate cleaning system according to an embodiment of the disclosure.

As shown in FIG. 3, the curved target substrate cleaning system 100 has a first cleaning area A1 having a first curvature R1 of the curved target substrate CG, the cleaning area horizontal maintenance unit 150 clamps the front end of the curved target substrate CG so as to press it in a plane with the pressure-type cleaning means 210 and moves along the transfer rail 131 of the transfer means 130, so it can be placed close to the pressure-type cleaning means 210.

As shown in FIG. 4, the curved target substrate cleaning system 100 can clamp the leading end of the curved target substrate CG by using the cleaning area horizontal maintenance unit 150, and adjust its height while moving away from the pressure-type cleaning means 210 along the transfer rail 131 of the transfer means 130, and can lift the leading end of the curved target substrate CG at a certain angle, with the second cleaning area A2 having the second curvature R2 of the curved target substrate CG placed flat against the planer pressure-type cleaning unit 210 to be pressurized against the flat surface.

Figure 5:
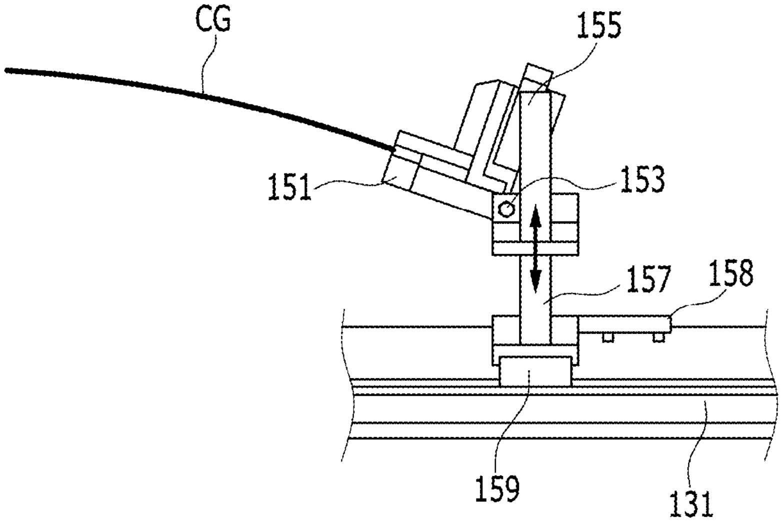
FIG. 5 is a configuration diagram of the cleaning area horizontal maintenance unit of the curved target substrate cleaning system according to an embodiment of the disclosure.

FIG. 5 is a configuration diagram of a cleaning area horizontal maintenance unit of a curved target substrate cleaning system according to an embodiment of the disclosure.

As shown in FIG. 5, the cleaning area horizontal maintenance unit 150 of the curved target substrate cleaning system 100 holds one end of the curved target substrate CG between the upper and lower clamps, and includes a clamping part 151 that clamps and supports a turn drive part 153 that drives the clamping part 151 to make a small turn of a predetermined angle, and a vertical support part 155 that supports the turn drive part 153, and a height adjustment unit 157 configured to move the clamping part 151 up and down by adjusting the height of the vertical support unit 155. The clamping unit 151 moves the tip of the curved target substrate CG, a fall prevention part 158 protrudes in the opposite direction to the clamping part 151 to ensure stable clamping and prevent tipping during work, and a transfer rail 131 that supports the vertical support part 155 from the bottom, and it may include a transfer rail coupling portion 159 capable of horizontal reciprocating movement.

The turn drive unit 153 is provided with a ball joint 153*a* rotatable by 360 degrees and can be adjusted in small increments to 360 degrees, so that the clamping part 151 can be driven to turn in small increments by a predetermined angle, thereby adjusting the position of the height adjustment unit 157 even if the cleaning area of the curved target substrate CG is arranged at a predetermined height. This adjustment mechanism allows the curved target substrate CG to be arranged in a specific position with respect to the pressure-type cleaning means 210 even if a local curvature change may occur, ensuring a thorough cleaning regardless of curvature change.

The height adjusting unit 157 may use various types of devices, including but not limited to a stepper motor.

When a stepper motor is used, a screw or other configuration may be used to transform the rotational movement of the central axis of the motor into linear movement, and the connecting shaft may be a screw.

Since this configuration may be set up according to known techniques, detailed description on how to set up the configuration will be omitted.

The fall prevention part 158 may be a weight, and includes a binding part 158*a* bound to the transfer rail 131, so that a curved target substrate CG can be formed using the length of the transfer rail 131, and even if it is large, the weight can be offset, so the clamp unit 151 can stably clamp the curved target substrate CG.

Figure 6:
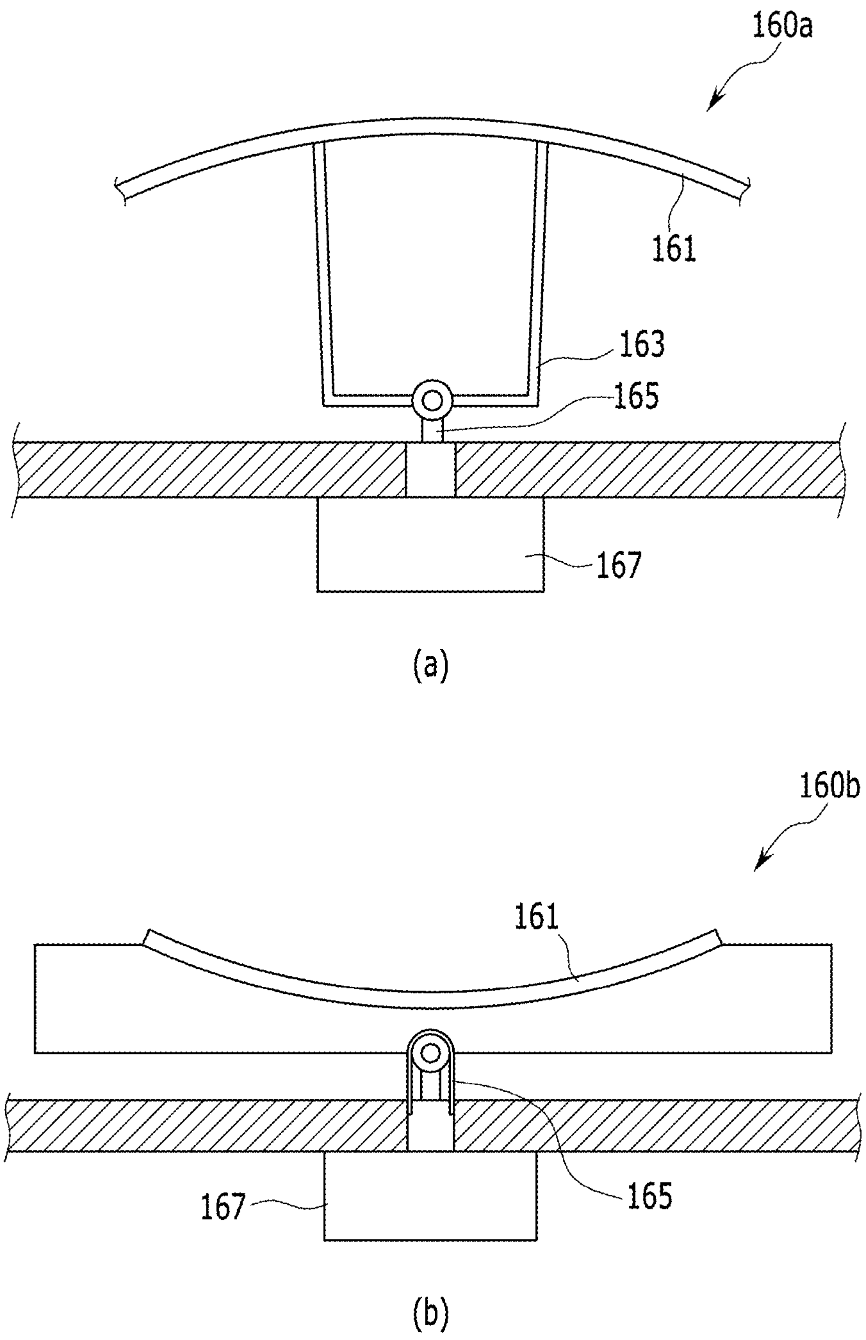
FIG. 6 is a diagram showing the configuration of the lower jig of the curved target substrate cleaning system according to a first embodiment of the disclosure.

FIG. 6 is a diagram showing the configuration of a lower jig of a curved target substrate cleaning system according to a first embodiment of the disclosure.

Figure 7:
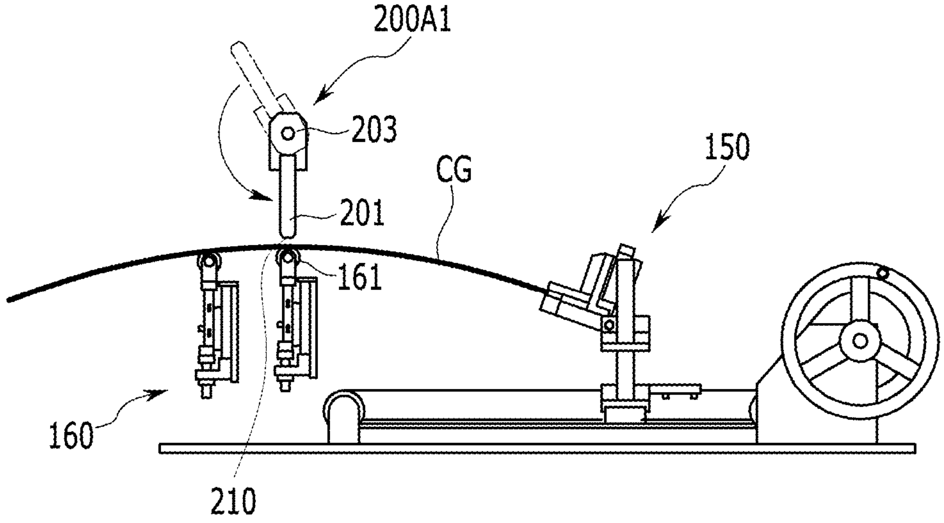
FIG. 7 is a configuration diagram of a curved target substrate cleaning system according to a second embodiment of the disclosure.
Figure 8:
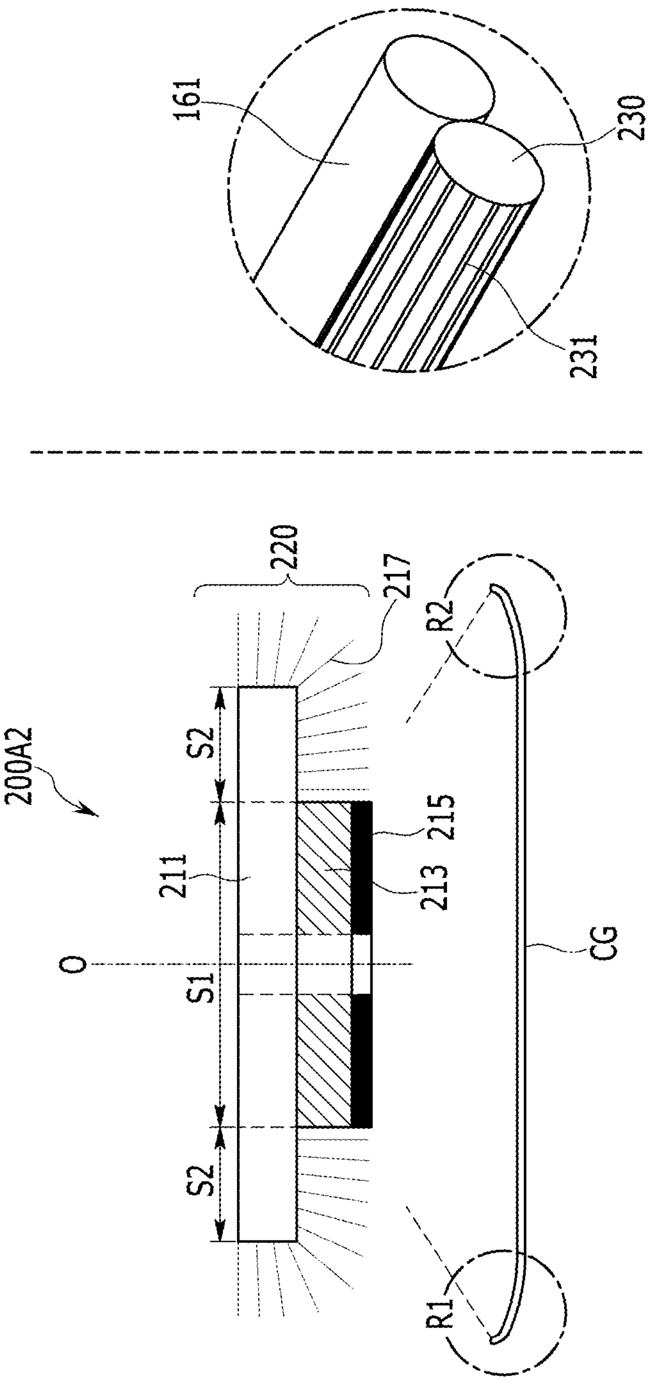
FIG. 8 is a configuration diagram of a cleaning roller of a curved target substrate cleaning system according to a third embodiment of the disclosure.

As shown in FIG. 6(*a*), FIG. 6(*b*), FIG. 7, and FIG. 8, the curved target substrate cleaning system 200A1/200A2 has a curved target substrate CG at the bottom of the pressure-type cleaning unit 210 and may be provided with lower jig units 160*a* and 160*b* corresponding to the curvature of the curved target substrate instead of the large backup roller 230 (shown in FIG. 8) as the lower support unit 160 for transportable support.

The lower jig unit (160*a*, 160*b*) may include a curved surface part 161 corresponding to the curvature of the curved target substrate (G, CG), a support part 163 supporting the curved surface part 161, a lower jig pivot part 165 that swivels the curved surface part 161 at a certain angle so that it can correspond to the curvature of the curved target substrate (G, CG), and a lower jig height adjustment part 167 that adjusts the height of the support part 163.

The curved surface portion 161 may have a curvature with an overall convex surface, as shown in FIG. 6(*a*), and may have a curvature with an overall concave surface, as shown in FIG. 6(*b*).

FIG. 7 is depicts a curved target substrate cleaning system according to a second embodiment of the disclosure.

As shown in FIG. 7, the curved target substrate cleaning system 200A1 uses the pressure-type cleaning unit 210 to clean the curved target substrates G and CG. It may be a knife or blade 201 that scrapes adhesive contaminants from an area, and the knife 201 is rotatably fixed by a knife fixing part 203, while the knife fixing part 203 is tilted at a predetermined angle, and by rotating, the knife 201 can apply planar pressure to the cleaning area of the curved target substrates G and CG.

The cleaning area horizontal maintenance unit 150 clamps the front end of the curved target substrate CG so that the end of the knife 201 is placed orthogonally to the cleaning area of the curved target substrate, and with the transfer rail 131 of the transfer unit 130, when moving back and forth along, adhesive contaminants can be removed from the cleaning area of the curved target substrate CG.

The knife 201 is made of hard silicone, natural rubber, silicone rubber, acrylic rubber, polyethylene rubber, PV (polyvinyl), and EPDM an (ethylene propylene diene monomer), etc. may be a rubber material.

Additionally, the blade may contain a polymer such as polyester, polyethylene, or polyoxymethylene.

FIG. 8 is a configuration diagram of a cleaning roller of a curved target substrate cleaning system according to a third embodiment of the disclosure.

In the curved target substrate cleaning system 200A2 according to the third embodiment of the disclosure, the pressure-type cleaning unit 210 rotates adhesive contaminants with respect to the cleaning area of the curved target substrates (G, CG), and it may be a cleaning roller 210 that can be scraped off.

A cleaning roller 220 may be formed with a protrusion 213 spaced apart from the cylindrical part 211 at a predetermined distance, and the end of the protrusion 213 has a sharp tip to provide support for the curved target substrates (G, CG), while the cleaning area may further be provided with a tip 215 that is configured to scrape off adhesive contaminants. At least part of the tip 215 may be rigid.

The aforementioned cleaning roller 220 can further include a brush part 217 having bristles that may vary in length and spacing to achieve a general curvature that corresponds to the multi-curvature of the second cleaning area S2 with a curvature R2. The curvature R2 may be larger than the first curvature R1 of the first cleaning area S1 of the multi-curvature target substrate (G, CG).

The cleaning roller 220 has the protrusion 213 and the tip 215 arranged in a stripe along the longitudinal direction with respect to the cylindrical part 211, so that the adhesive is not contaminated when the cleaning roller 220 is rotated. A material (OCA; optically clear adhesive) may be scraped by the tip 215 and discharged through the space 212 between the protrusions 213.

The protrusion 213 and the tip 215 have greater hardness than the cylindrical portion 211, and may be configured to be interchangeable with the cylindrical portion 211.

The protrusion 213 and the tip 215 are made of hard silicone, natural rubber, silicone rubber, acrylic rubber, polyethylene rubber, PV (polyvinyl), and EPDM (ethylene propylene), and it may be a rubber material such as a diene monomer (ethylene propylene diene monomer).

Additionally, the blade may contain a polymer such as polyester, polyethylene, or polyoxymethylene.

In particular, the protrusion 213 and the tip 215 can be made of hard silicone to prevent adhesive contaminants from sticking to the protrusion 213 and the tip 215.

If constructing the material of the protrusion 213 and the tip 215 differently from that of the lower support roller, the lower support roller or the cylindrical part 211 can use urethane, which has superior durability compared to silicon.

The cleaning roller 220 may be made to have a predetermined hardness, preferably a shore hardness of 50 degrees, and a pressing amount of about 2 mm to prevent scratches or damage to the target substrate.

According to the cleaning system and method according to an embodiment of the disclosure, the stress applied to the target substrate can be minimized because the cleaning area can be maintained in a horizontal position when cleaning with the pressure-type cleaning unit 210, thereby maximizing cleansing power.

Figure 9:
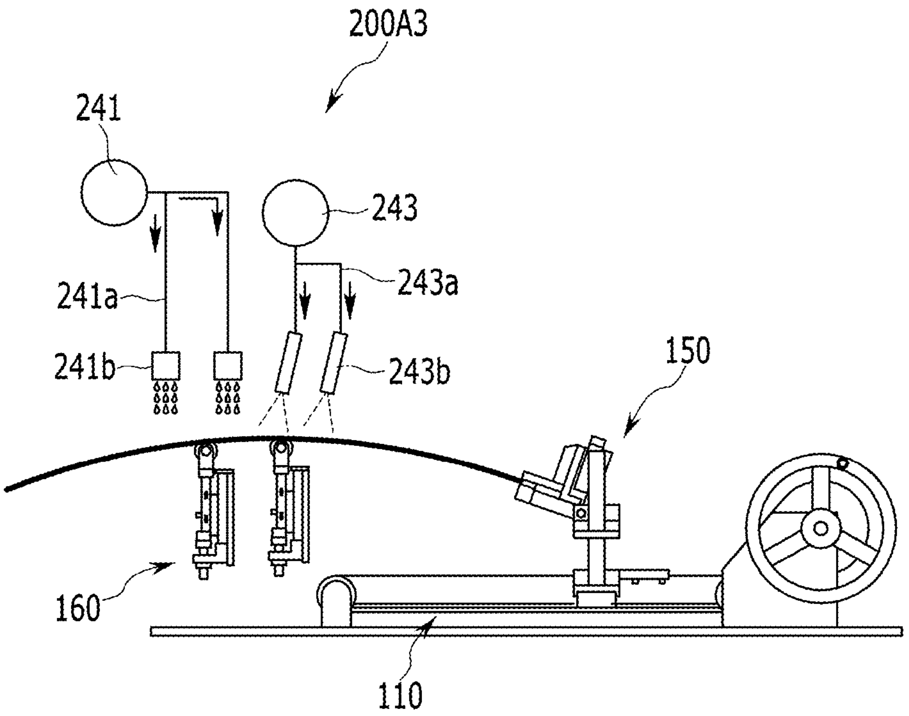
FIG. 9 is a configuration diagram of a curved target substrate cleaning system according to a fourth embodiment of the disclosure.

FIG. 9 is a configuration diagram of a curved target substrate cleaning system according to a fourth embodiment of the disclosure.

As shown in FIG. 9, in the curved target substrate cleaning system 200A3 according to the fourth embodiment of the disclosure, the pressure-type cleaning unit 210 uses the adhesive of the curved target substrates G and CG, it may be a chemical cleaning unit 240 that can dissolve and remove contaminants OCA.

With respect to the cleaning area of the curved target substrate (G, CG), the cleaning area horizontal maintenance unit 150 clamps the front end of the curved target substrate CG and moves along the transfer rail 131 of the transfer unit 130. While moving, the cleaning area of the curved target substrate CG is arranged to become flat with respect to the chemical cleaning unit 240, so that adhesive contaminants OCA can be removed more efficiently.

In addition, the curved target substrates (G, CG) may be heated to 60 degrees, or the melting point temperature of adhesive contaminants, before cleaning by the chemical cleaning unit 240. In some cases, the melting point temperature may be heated to 50 to 70 degrees.

The chemical cleaning unit 240 may include a cleaning liquid tank 241, a first pipe 241*a* connected to the cleaning liquid tank 241, and a cleaning liquid spray nozzle 241*b*. Additionally, the cleaning liquid spray nozzle 241*b* are formed corresponding to a multi-curvature of CG, the air pump 243 and the air conduit 243*a* and air blower connected to the air pump 243 are used to spray the cleaning liquid in a flat pressure type on the cleaning area of the target substrate CG and to immediately dry and discard the cleaning liquid. An air blower 243*b* may be further included.

Since adhesive contaminants OCA are organic substances, the cleaning liquid contains volatile components and can be volatilized by air sprayed from the air blower 243*b*.

Figure 10:
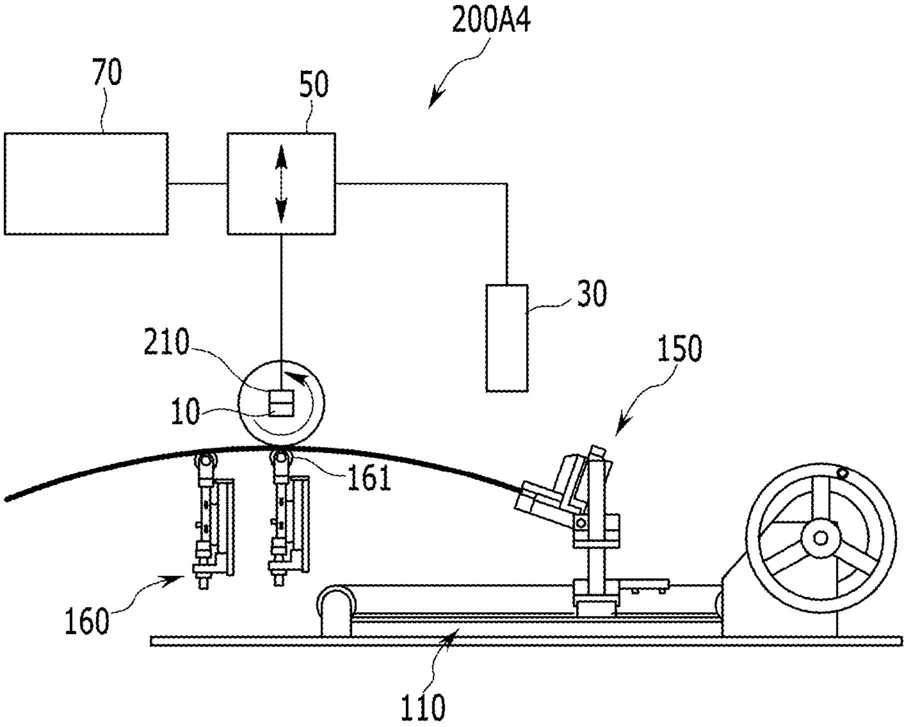
FIG. 10 is a configuration diagram of a curved target substrate cleaning system according to a third embodiment of the disclosure.

FIG. 10 is a configuration diagram of a curved target substrate cleaning system according to a fifth embodiment of the disclosure.

The curved target substrate cleaning system 200A4 clamps the front end of the curved target substrate CG with a cleaning area horizontal maintenance unit 150 and moves along the transfer rail 131 of the transfer unit 130, so that the cleaning area of the curved target substrate CG is horizontally arranged adjacent to the planar pressure-type cleaning unit 210, and for more precise control, a pressure sensor 10 can be provided so that the pressure-type cleaning unit 210 can apply uniform pressure to the cleaning area of the curved target substrate CG.

In addition, the cleaning area horizontal maintenance unit 150 clamps the front end of the curved target substrate CG and moves back and forth along the transfer rail 131 of the transfer unit 130 to clean the curved target substrate CG, and it may further include a surface curvature measurement sensor 30 capable of measuring the curvature of the curved target substrate CG so that it can be arranged horizontally with respect to the surface.

The surface curvature measurement sensor 30 can be used to measure distance using a non-contact laser measuring device, etc., but is not limited to this, and for example, an infrared method, an ultrasonic sensor method, etc. can also be used.

The surface curvature measurement sensor 30 can measure the height of the surface of the cleaning area of the curved target substrate CG, thereby obtaining a surface profile, and the memory of the pressure-type cleaning unit 210, which is stored in the unit 50 and the moving speed and pressing amount of the planar pressure-type cleaning unit 210 can be controlled by the control unit 70.

Figure 11:
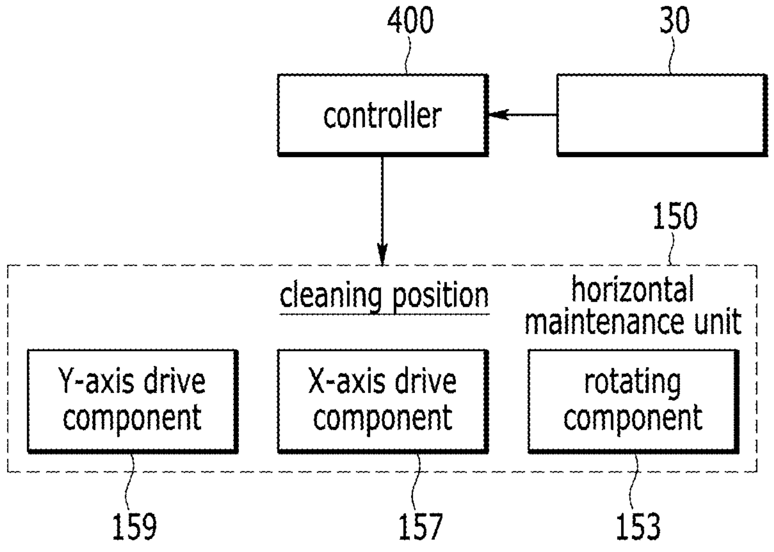
FIG. 11 is an internal configuration diagram of the control device of FIG. 10.
Figure 12:
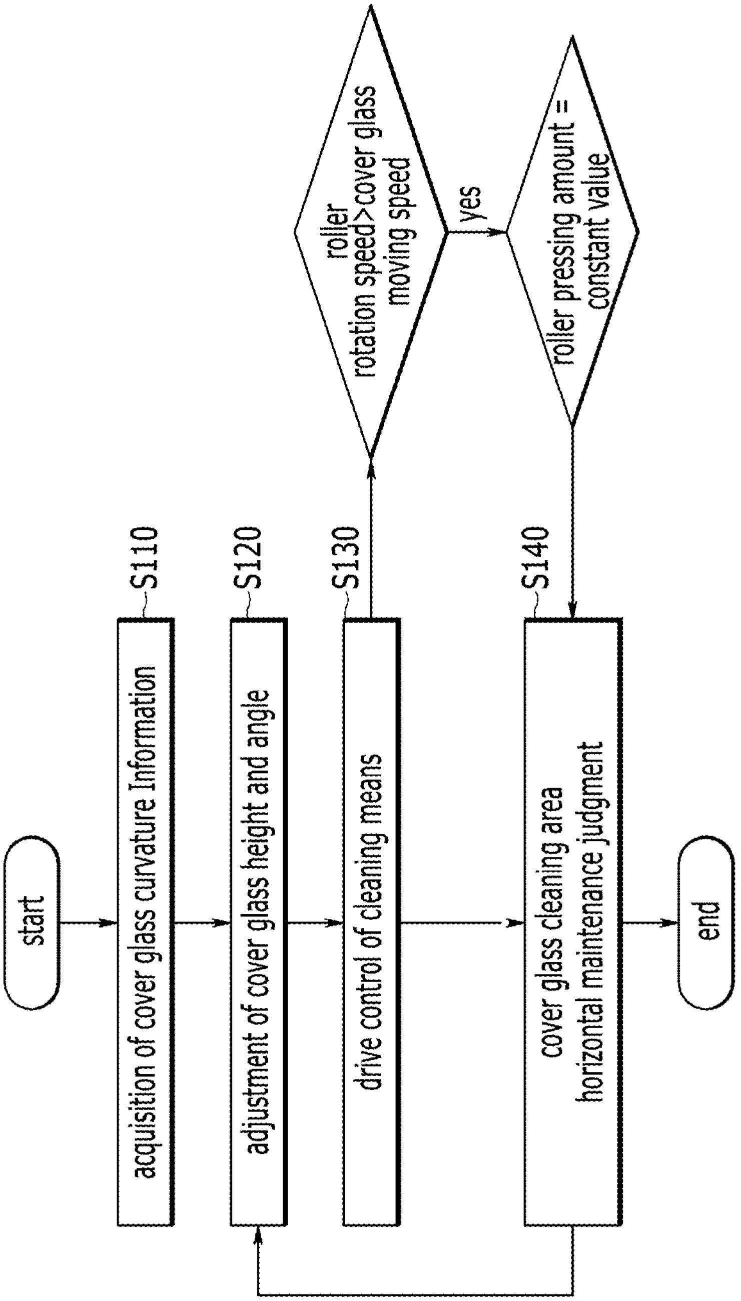
FIG. 12 is a diagram showing a method for cleaning a curved target substrate according to an embodiment of another aspect of the disclosure.

With reference to FIGS. 11 and 12, a method for cleaning a target substrate with multiple curvatures according to an embodiment of another aspect of the disclosure will be described.

FIG. 11 is an internal configuration diagram of the control device of FIG. 10, and FIG. 12 is a diagram showing a method of cleaning a curved target substrate according to an embodiment of another aspect of the disclosure.

The curved target substrate cleaning system 200A4 further includes a control device 400 and a surface curvature measurement sensor 30, and the micro-curvature of the cleaning area leveling unit 150 in the cleaning area of the curved target substrate CG is operated by operating the cleaning area horizontal maintenance unit 150 which can be controlled in conjunction with the surface curvature measurement sensor 30 so that it can be placed horizontally.

The method of cleaning a curved target substrate acquires curvature information that changes along the surface of the target substrate (G, CG) e.g., the cover glass, using a pressure sensing sensor 10 or a surface curvature measurement sensor 30 (S110), the cleaning area horizontal maintenance unit 150 supports the front end of the curved target substrate CG by clamping it between the upper and lower clamps of the clamping part 151 (shown in FIG. 5), adjusts the height of the clamping part 151 by primarily using a height adjustment part 157, and rotates the clamping part 151 at a certain angle using a turn drive part 153. The cleaning area horizontal maintenance unit 150 moves with the transfer rail coupling part 159 horizontally along the transfer rail 131 so that the cleaning area of the curved target substrate CG is horizontally arranged with respect to the pressure type cleaning unit 210 (S120).

The pressure-type cleaning unit 210 is driven (S130), but the working speed of the pressure-type cleaning unit 210, for example, when the pressure-type cleaning unit 210 is a cleaning roller, it is determined whether the rotation speed is greater than the moving speed of the cleaning area of the curved target substrate CG, and the cleaning roller applies a uniform predetermined pressure to the cleaning area of the curved target substrate CG while cleaning the curved target substrate CG.

If the measured value of the pressure sensor 10 or surface curvature measurement sensor 30 does not apply a uniform predetermined pressure to the cleaning area of the curved target substrate CG, or if the pressure-type cleaning unit 210 is not maintained horizontal to the cleaning area of the curved target substrate CG, feedback control can be performed through the cleaning area horizontal maintenance unit 150 (S140).

The cleaning area horizontal maintenance unit 150 supports the tip of the curved target substrate CG by clamping it between the upper and lower clamps of the clamping part 151, and adjusts the height of the clamping part 151 through the height adjustment unit 157. The height of the clamping part 151 is primarily adjusted using the turn drive unit 153, and the transport rail coupling part 159 moves horizontally along the transport rail 131, while the cleaning area of the curved target substrate CG can be modified to be arranged horizontally adjacent to the pressure-type cleaning unit 210.

According to the cleaning system and method according to an embodiment of the disclosure, the stress applied to the target substrate can be minimized because the cleaning area can be maintained in a horizontal orientation while cleaning the pressure-type cleaning unit, that is, the cleaning roller or pad, so cleansing power can be maximized.

According to the cleaning system and cleaning method of the disclosure, the material of the pressure-type cleaning unit is a material such as silicon to which adhesive contaminants do not stick well, and the target substrate is applied to the pressure-type cleaning unit, and for the lower support means, a material with greater durability than silicon can be used.

According to the cleaning system and method, the probability of the cleaning area of the target substrate being cleaned can be increased by increasing the working speed or rotation speed of the pressure-type cleaning unit and the moving speed of the target substrate.

According to the cleaning system and cleaning method, it is possible to prevent damage such as scratches from occurring in the cleaning area of the target substrate by controlling the amount of pressure of the pressure-type cleaning unit on the cleaning area of the target substrate.

According to the cleaning system and method, before cleaning the cleaning area of the target substrate with a pressure-type cleaning unit, the target substrate is heated to 60 degrees or higher, where adhesive contaminants can be effectively removed. In some embodiments, the target substrate may be heated to 50 to 70 degrees can facilitate removal of adhesive contaminants.

The foregoing is illustrative of embodiments and is not to be construed as limiting to the disclosure. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A curved target substrate cleaning system, comprising:

a pressure-type cleaning unit for cleaning a cleaning area of a target substrate having a curved portion by applying pressure such that the curvature of the target substrate's surface varies according to the position on the surface;

a support body detachably supporting the pressure-type cleaning unit at a predetermined height with respect to the cleaning area of the target substrate having the curved portion;

a cleaning area flat maintenance unit that clamps one end of the target substrate having the curved portion and adjusts a height of the curved portion to maintain the cleaning area of the target substrate in a predetermined orientation with respect to the pressure-type cleaning unit; and a moving unit that moves the cleaning area flat maintenance unit back and forth in one direction with respect to the pressure-type cleaning unit.

2. The curved target substrate cleaning system of claim 1, comprising:

a clamping part for supporting the cleaning area flat maintenance unit by clamping a front end of the curved target substrate between upper and lower clamps; and a height adjustment unit for adjusting a height of the clamping portion.

3. The curved target substrate cleaning system of claim 2, further comprising:

a turn drive part that causes the clamping part to pivot at a predetermined angle, wherein the turn drive part includes an articulated ball capable of turning 360 degrees.

4. The curved target substrate cleaning system of claim 2, further comprising:

a fall prevention part protruding from the height adjustment unit in a different direction from the clamping part;

a transfer unit including a transport rail joint that rides back and forth on a transfer rail; and a vertical support portion supporting the clamping part at a predetermined distance from the transport rail joint.

5. The curved target substrate cleaning system of claim 1, wherein the pressure-type cleaning unit applies pressure to the cleaning area of the target substrate during cleaning, and further includes a lower support unit for supporting the target substrate from below, and the lower support unit is a lower jig unit including a curved surface portion having a shape that varies in response to the curvature of the target substrate and a support portion that supports the curved surface portion, and the curved surface portion is either convex or concave for cleaning the curved target substrate.

6. The curved target substrate cleaning system of claim 5, wherein the lower jig unit cleans a curved target substrate including a lower jig swing driving portion that rotates the curved surface portion at a predetermined angle corresponding to the curvature of the target substrate, and a lower jig height adjustment portion that adjusts the height of the support portion.

7. The curved target substrate cleaning system of claim 1, wherein the pressure-type cleaning unit is a knife or blade that scrapes adhesive contaminants on the cleaning area of the target substrate, and the knife or blade is rotatably fixed and made of a high hardness silicone material.

8. The curved target substrate cleaning system of claim 1, wherein the pressure-type cleaning unit comprises a cleaning roller that scrapes and grinds adhesive contaminants against the cleaning area of the target substrate, and the cleaning roller includes a central cylindrical portion, a protrusion extending from the cylindrical portion, wherein the protrusion has a tip attached to an end.

9. The curved target substrate cleaning system of claim 8, wherein the cleaning roller further includes a brush portion, and the protrusion and the tip are made of a silicone material non-adhesive to contaminants.

10. The curved target substrate cleaning system of claim 1, wherein the pressure-type cleaning unit comprises a chemical cleaning unit that melts and removes adhesive contaminants from the cleaning area of the target substrate by heating the target substrate above the melting point of the adhesive contaminants, and the chemical cleaning unit includes a cleaning solution spray nozzle and an air blower for drying the cleaning solution.

11. The curved target substrate cleaning system of claim 1, further comprising:

a pressure sensing sensor for sensing the pressure of the pressure-type cleaning unit on the cleaning area of the target substrate, a surface curvature measuring sensor for measuring curvatures of the target substrate and the pressure sensing sensor, a control unit for feedback controlling an operation of the pressure-type cleaning unit and the cleaning area flat maintenance unit according to the measured curvature.

* * * * *